United States Patent
Parker et al.

(10) Patent No.: US 11,226,761 B2
(45) Date of Patent: Jan. 18, 2022

(54) WEIGHTED READ COMMANDS AND OPEN BLOCK TIMER FOR STORAGE DEVICES

(71) Applicant: Western Digital Technologies, Inc., San Jose, CA (US)

(72) Inventors: Liam Parker, Edinburgh (GB); Daniel L. Helmick, Broomfield, CO (US); Alan D. Bennett, Edinburgh (GB); Sergey Anatolievich Gorobets, Edinburgh (GB)

(73) Assignee: Western Digital Technologies, Inc., San Jose, CA (US)

( * ) Notice: Subject to any disclaimer, the term of this patent is extended or adjusted under 35 U.S.C. 154(b) by 39 days.

(21) Appl. No.: 16/858,390

(22) Filed: Apr. 24, 2020

(65) Prior Publication Data
US 2021/0334032 A1    Oct. 28, 2021

(51) Int. Cl.
G06F 3/06    (2006.01)

(52) U.S. Cl.
CPC .......... *G06F 3/0652* (2013.01); *G06F 3/0604* (2013.01); *G06F 3/064* (2013.01);
(Continued)

(58) Field of Classification Search
CPC ...... G06F 3/064; G06F 3/0616; G06F 3/0619; G06F 3/0652; G06F 3/0679; G06F 3/0659; G06F 3/0604
See application file for complete search history.

(56) References Cited

U.S. PATENT DOCUMENTS

| 10,048,863 B1 * | 8/2018 | Goss | G06F 3/064 |
| 10,459,839 B1 * | 10/2019 | Pletka | G06F 3/0608 |

(Continued)

FOREIGN PATENT DOCUMENTS

CN    106959818 A    7/2017

OTHER PUBLICATIONS

Li-Pin Chang et al., "Current-Aware Flash Scheduling for Current Capping in Solid State Disks", Feb. 2020, IEEE, Transactions on Computer-Aided Design of Integrated Circuits and Systems, vol. 39, No. 2. 321-334 (Year: 2020).*
(Continued)

*Primary Examiner* — Reginald G Bragdon
*Assistant Examiner* — Curtis James Kortman
(74) *Attorney, Agent, or Firm* — Patterson & Sheridan, LLP; Steven H. Versteeg

(57) ABSTRACT

The present disclosure generally relates to methods of operating storage devices. The storage device comprises a controller and a storage unit divided into a plurality of zones. Each zone comprises a plurality of dies, where each die comprises a plurality of erase blocks. Each erase block comprises a plurality of wordlines. One or more wordlines are grouped together in bins. Each bin is associated with a susceptibility weight, a read count weight, a timer count weight, and a running total weight. A weight counter table is stored in the controller, and tracks the various weights associated with each bin. When a sum of the weights of each bin reaches or exceeds a predetermined value, the controller closes the erase block to avoid an unacceptable quantity of bit error accumulation. The bit error susceptibility of an erase block decreases after the erase block is at capacity or is closed.

19 Claims, 11 Drawing Sheets

550 —

| BIN # | # OF WORDLINES | SUSCEPTIBILITY WEIGHT (Sw) | READ COUNT WEIGHT (Rc) | TIMER COUNT WEIGHT (Y_bin n) | RUNNING TOTAL WEIGHT (Tn) |
|---|---|---|---|---|---|
| Y0 | 100 | 0.5 | 5 | 25 | 62.5 |
| Y1 | 23 | 1 | 23 | 17 | 391 |
| Y2 | 14 | 2 | 5 | 17 | 170 |
| Y3 | 6 | 3 | 11 | 2 | 66 |
| Yn | 0 | | | | |

(52) U.S. Cl.
CPC .......... *G06F 3/0619* (2013.01); *G06F 3/0659* (2013.01); *G06F 3/0679* (2013.01)

(56) References Cited

U.S. PATENT DOCUMENTS

| | | |
|---|---|---|
| 2013/0304982 A1 | 11/2013 | Jung et al. |
| 2014/0173180 A1 | 6/2014 | D'Abreu et al. |
| 2015/0135039 A1* | 5/2015 | Mekhanik ............ G06F 11/1072 714/773 |
| 2016/0124679 A1* | 5/2016 | Huang ................ G11C 16/349 711/103 |
| 2016/0141047 A1* | 5/2016 | Sehgal ................ G11C 11/5642 365/185.02 |
| 2017/0075593 A1* | 3/2017 | Kim ...................... G06F 3/0616 |
| 2018/0004415 A1 | 1/2018 | Lee et al. |
| 2018/0068726 A1 | 3/2018 | Song et al. |
| 2019/0051361 A1 | 2/2019 | Park |
| 2020/0051621 A1* | 2/2020 | Papandreou .......... G06F 3/0659 |

OTHER PUBLICATIONS

International Search Report and the Written Opinion for International Application No. PCT/US2020/064914 dated Mar. 25, 2021, 12 pages.

\* cited by examiner

| BIN # | # OF WORDLINES | SUSCEPTIBILITY WEIGHT (Sw) | READ COUNT WEIGHT (Rc) | TIMER COUNT WEIGHT (Y_bin n) | RUNNING TOTAL WEIGHT (Tn) |
|---|---|---|---|---|---|
| Y0 | 10 | 0.5 | 1 | 20 | 10 |
| Y1 | 10 | 0.5 | 2 | 15 | 15 |
| ... | ... | ... | ... | ... | ... |
| Y15 | 10 | 1 | 3 | 6 | 18 |
| Y16 | 10 | 2 | 5 | 5 | 50 |
| Y17 | 10 | 3 | 19 | 5 | 285 |
| Yn | 0 | | | | |

FIG. 4B

| BIN # | # OF WORDLINES | SUSCEPTIBILITY WEIGHT (Sw) | READ COUNT WEIGHT (Rc) | TIMER COUNT WEIGHT (Y_bin n) | RUNNING TOTAL WEIGHT (Tn) |
|---|---|---|---|---|---|
| Y0 | 100 | 0.5 | 5 | 25 | 62.5 |
| Y1 | 23 | 1 | 23 | 17 | 391 |
| Y2 | 14 | 2 | 5 | 17 | 170 |
| Y3 | 6 | 3 | 11 | 2 | 66 |
| Yn | 0 | | | | |

FIG. 5B

| BIN # | # OF WORDLINES | SUSCEPTIBILITY WEIGHT (Sw) | READ COUNT WEIGHT (Rc) | TIMER COUNT WEIGHT (Y_bin n) | PREVIOUS TOTAL WEIGHT (Pw) | RUNNING TOTAL WEIGHT (Tn) |
|---|---|---|---|---|---|---|
| Y0 | 75 | 0.5 | 2 | 25 | 0 | 25 |
| Y1 | 35 | 1 | 6 | 15 | 0 | 90 |
| Y2 | 25 | 2 | 1 | 10 | 0 | 20 |
| Y3 | 10 | 3 | 0 | 10 | 0 | 0 |
| ⋮ | | ⋮ | ⋮ | ⋮ | ⋮ | ⋮ |
| Yn | 0 | | | | | |

FIG. 6B

| BIN # | # OF WORDLINES | SUSCEPTIBILITY WEIGHT (Sw) | READ COUNT WEIGHT (Rc) | TIMER COUNT WEIGHT (Y_bin n) | PREVIOUS TOTAL WEIGHT (Pw) | RUNNING TOTAL WEIGHT (Tn) |
|---|---|---|---|---|---|---|
| Y0 | 40 | 0.5 | 2 | 40 | 25 | 65 |
| Y1 | 35 | 0.5 | 2 | 30 | 90 | 120 |
| Y2 | 25 | 0.5 | 2 | 25 | 20 | 45 |
| Y3 | 10 | 0.5 | 1 | 25 | 0 | 12.5 |
| ... | ... | ... | ... | ... | ... | ... |
| Y15 | 10 | 1 | 2 | 17 | 0 | 34 |
| Y16 | 10 | 2 | 7 | 2 | 0 | 28 |
| Y17 | 10 | 3 | 1 | 1 | 0 | 3 |

FIG. 6C

WEIGHTED READ COMMANDS AND OPEN BLOCK TIMER FOR STORAGE DEVICES

BACKGROUND OF THE DISCLOSURE

Field of the Disclosure

Embodiments of the present disclosure generally relate to storage devices, such as sold state drives (SSDs).

Description of the Related Art

Storage devices, such as SSDs, may be used in computers in applications where relatively low latency and high capacity storage are desired. For example, SSDs may exhibit lower latency, particularly for random reads and writes, than hard disk drives (HDDs). Typically, a controller of the SSD receives a command to read or write data from a host device to a memory device. The data is read and written to one or more erase blocks in the memory device. Each of the logical block addresses is associated with a physical media location so that the SSD and/or the host device know the location of where the data is stored. One or more erase blocks of the physical media may be grouped together by their respective logical block addresses to form a plurality of zones.

Erase blocks storing data may accumulate bit errors or read disturb errors after the data has been read from the erase block several times, which may lead to the data becoming lost or unreadable. When the total number of reads of data within an erase block exceeds a predetermined value such as 1000 reads, the erase block is closed to prevent data loss due to the accumulation of excessive bit errors or read disturb errors. A predetermined value such as the 1000 reads may signal the controller to either close an erase block prematurely or too late, allowing the erase block to accumulate an undesirable quantity of bit errors.

Therefore, what is needed is a new method of accurately determining the accumulation of bit errors in opened erase blocks in a storage device.

SUMMARY OF THE DISCLOSURE

The present disclosure generally relates to methods of operating storage devices. The storage device comprises a controller and a storage unit divided into a plurality of zones. Each zone comprises a plurality of dies, where each die comprises a plurality of erase blocks. Each erase block comprises a plurality of wordlines. One or more wordlines are grouped together in bins. Each bin is associated with a susceptibility weight, a read count weight, a timer count weight, and a running total weight. A weight counter table is stored in the controller, and tracks the various weights associated with each bin. When a sum of the weights of each bin reaches or exceeds a predetermined value, the controller closes the erase block to avoid an unacceptable quantity of bit error accumulation. The bit error susceptibility of an erase block decreases after the erase block is at capacity or is closed.

In one embodiment, a storage device comprises a non-volatile storage unit. The capacity of the non-volatile storage unit is divided into a plurality of zones. The non-volatile storage unit comprises a plurality of dies and each of the plurality of dies comprising a plurality of erase blocks. The storage device further comprises a controller coupled to the non-volatile storage unit. The controller is configured to write data associated with one or more first commands to a partially full first erase block of a first zone of the plurality of zones sequentially, where the first erase block having a writeable capacity. The data associated with the one or more first commands partially fills the first erase block to a first program point less than the writeable capacity. The controller is further configured to receive one or more read commands to read the data from the first erase block non-sequentially. Each of the one or more read commands is associated with a weight and at least two weights of the one or more read commands are different. The weights are based on a closeness of the data being read to the first program point and an amount of time the first erase block has been open.

In another embodiment, a storage device comprises a non-volatile storage unit. The capacity of the non-volatile storage unit is divided into a plurality of zones. The non-volatile storage unit comprises a plurality of dies and each of the plurality of dies comprising a plurality of erase blocks. The storage device further comprises a controller coupled to the non-volatile storage unit. The controller is configured to receive a plurality of read commands to read data from a partially full first erase block of a first zone of the plurality of zones non-sequentially. The first erase block comprises a plurality of wordlines and the plurality of wordlines is divided into one or more bins. Each bin is associated with a weight and the weights are based on a location of the bin within the first erase block and an amount of time the first erase block has been open. The controller is further configured to increase each of the weights each time a predetermined amount of time has passed and close the first erase block when a sum of the weights associated with the bins accumulates to a predetermined value or when one or more write commands are received to fill the first erase block to a full write capacity.

In another embodiment, a storage device comprises a non-volatile storage unit. The capacity of the non-volatile storage unit is divided into a plurality of zones. The non-volatile storage unit comprises a plurality of dies and each of the plurality of dies comprising a plurality of erase blocks. Each of the plurality of erase blocks comprises a plurality of wordlines and the plurality of wordlines of each erase block are divided into one or more bins. The storage device further comprises a controller coupled to the non-volatile storage unit. The controller is configured to receive one or more first read commands to read data from a first bin of a partially full first erase block of a first zone of the plurality of zones, where the first bin being associated with a first weight, and increase the first weight associated with the first bin after a predetermined amount of time has passed a first time. The controller is further configured to receive one or more second read commands to read data from a second bin of the partially full first erase block, where the second bin being associated with a second weight different than the first weight, and increase the first weight associated with the first bin and the second weight associated with the second bin after the predetermined amount of time has passed a second time. The controller is also configured to receive one or more third read commands to read the data from the first bin, increase the first weight associated with the first bin after the data stored in the first bin is read in response to the one or more third read commands, and close the first erase block when a sum of the first and second weights accumulates to a predetermined value.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 4B is a table further illustrating the illustrating the susceptibility to errors of different bins of an erase block of FIG. 4A, according to one embodiment.

FIG. 5B is a table further illustrating the susceptibility to errors of different bins of an erase block of FIG. 5A, according to another embodiment.

FIGS. 6B-6C are tables further illustrating the susceptibility to errors of different bins of an erase block of FIG. 6A, according to various embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to methods of operating storage devices. The storage device comprises a controller and a storage unit divided into a plurality of zones. Each zone comprises a plurality of dies, where each die comprises a plurality of erase blocks. Each erase block comprises a plurality of wordlines. One or more wordlines are grouped together in bins. Each bin is associated with a susceptibility weight, a read count weight, a timer count weight, and a running total weight. A weight counter table is stored in the controller, and tracks the various weights associated with each bin. When a sum of the weights of each bin reaches or exceeds a predetermined value, the controller closes the erase block to avoid an unacceptable quantity of bit error accumulation. The bit error susceptibility of an erase block decreases after the erase block is at capacity or is closed.

Figure 1:
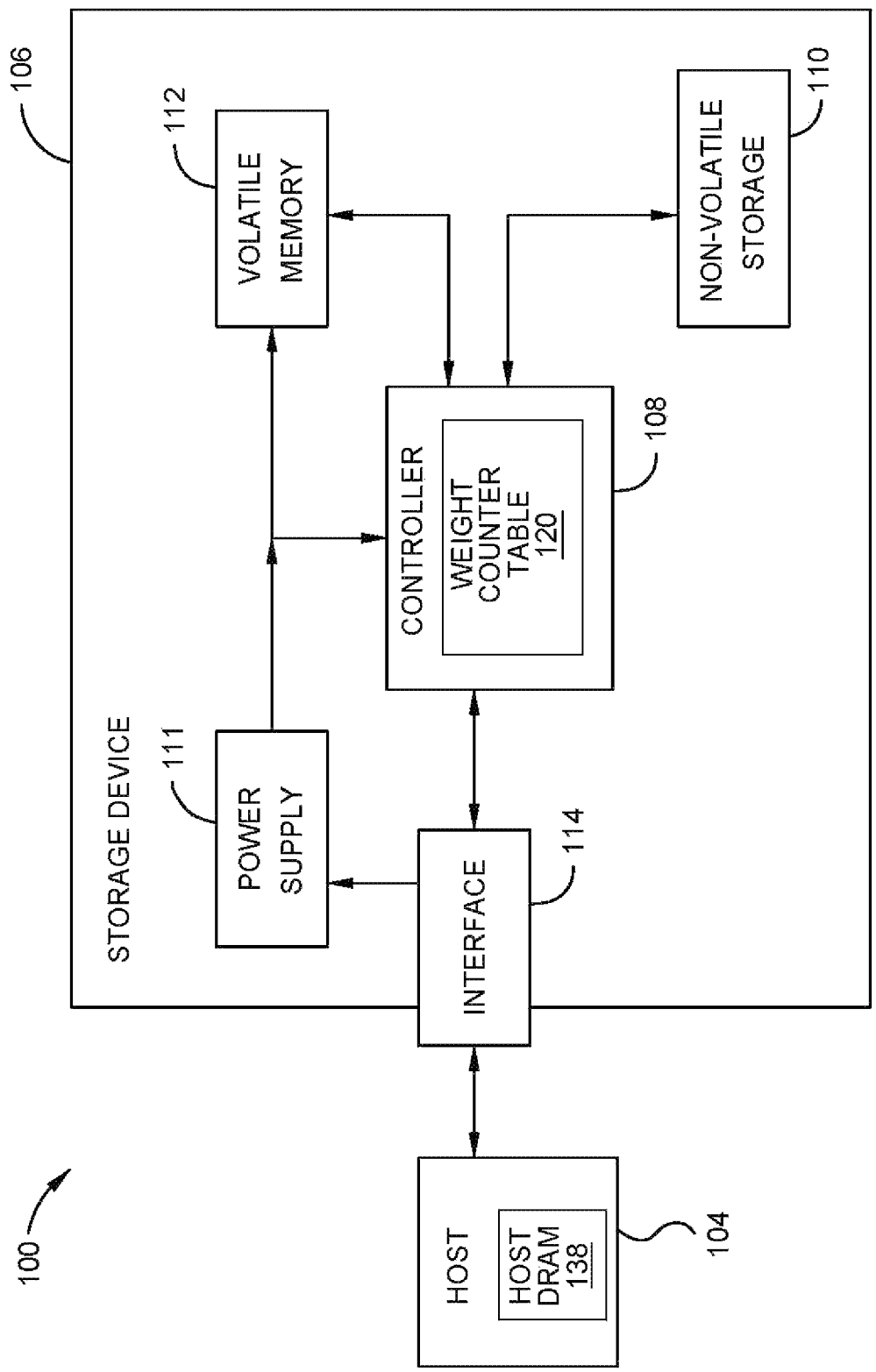
FIG. 1 is a schematic block diagram illustrating a storage system, according to one embodiment.

FIG. 1 is a schematic block diagram illustrating a storage system 100 in which storage device 106 may function as a storage device for a host device 104, in accordance with one or more techniques of this disclosure. For instance, the host device 104 may utilize a storage unit 110, such as non-volatile memory (NVM), included in storage device 106 to store and retrieve data. The storage unit 110 may be any type of non-volatile memory, such as MRAM, NAND, NOR, or HDD, for example. In the following descriptions, the storage unit 110 is referenced as a non-volatile memory (NVM) 110 for simplification and exemplary purposes. The host device 104 comprises a host DRAM 138. In some examples, the storage system 100 may include a plurality of storage devices, such as the storage device 106, which may operate as a storage array. For instance, the storage system 100 may include a plurality of storage devices 106 configured as a redundant array of inexpensive/independent disks (RAID) that collectively function as a mass storage device for the host device 104.

The storage system 100 includes a host device 104 which may store and/or retrieve data to and/or from one or more storage devices, such as the storage device 106. As illustrated in FIG. 1, the host device 104 may communicate with the storage device 106 via an interface 114. The host device 104 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, and the like.

The storage device 106 includes a controller 108, NVM 110, a power supply 111, volatile memory 112, and an interface 114. The controller 108 comprises an internal memory or buffer (not shown). In some examples, the storage device 106 may include additional components not shown in FIG. 1 for sake of clarity. For example, the storage device 106 may include a printed circuit board (PCB) to which components of the storage device 106 are mechanically attached and which includes electrically conductive traces that electrically interconnect components of the storage device 106, or the like. In some examples, the physical dimensions and connector configurations of the storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIex1, x4, x8, x16, PCIe Mini Card, MiniPCI, etc.). In some examples, the storage device 106 may be directly coupled (e.g., directly soldered) to a motherboard of the host device 104.

The interface 114 of the storage device 106 may include one or both of a data bus for exchanging data with the host device 104 and a control bus for exchanging commands with the host device 104. The interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, PCIe, non-volatile memory express (NVMe), OpenCAPI, GenZ, Cache Coherent Interface Accelerator (CCIX), Compute Express Link (CXL) Open Channel SSD (OCSSD), or the like. The electrical connection of the interface 114 (e.g., the data bus, the control bus, or both) is electrically connected to the controller 108, providing electrical connection between the host device 104 and the controller 108, allowing data to be exchanged between the host device 104 and the controller 108. In some examples, the electrical connection of the interface 114 may also permit the storage device 106 to receive power from the host device 104. For example, as illustrated in FIG. 1, the power supply 111 may receive power from the host device 104 via the interface 114.

The storage device 106 includes NVM 110, which may include a plurality of memory devices or memory units. NVM 110 may be configured to store and/or retrieve data. For instance, a memory unit of NVM 110 may receive data and a message from the controller 108 that instructs the memory unit to store the data. Similarly, the memory unit of NVM 110 may receive a message from the controller 108 that instructs the memory unit to retrieve data. In some examples, each of the memory units may be referred to as a die. In some examples, a single physical chip may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit of NVM 110 may include any type of non-volatile memory devices, such as flash memory devices, phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices.

The NVM 110 may comprise a plurality of flash memory devices or memory units. Flash memory devices may include NAND or NOR based flash memory devices, and may store data based on a charge contained in a floating gate of a transistor for each flash memory cell. In NAND flash memory devices, the flash memory device may be divided into a plurality of blocks which may be divided into a plurality of pages. Each block of the plurality of blocks within a particular memory device may include a plurality of NAND cells. Rows of NAND cells may be electrically connected using a wordline to define a page of a plurality of pages. Respective cells in each of the plurality of pages may be electrically connected to respective bit lines. Furthermore, NAND flash memory devices may be 2D or 3D devices, and may be single level cell (SLC), multi-level cell (MLC), triple level cell (TLC), or quad level cell (QLC). The controller 108 may write data to and read data from NAND flash memory devices at the page level and erase data from NAND flash memory devices at the block level.

The storage device 106 includes a power supply 111, which may provide power to one or more components of the storage device 106. When operating in a standard mode, the power supply 111 may provide power to the one or more components using power provided by an external device, such as the host device 104. For instance, the power supply 111 may provide power to the one or more components using power received from the host device 104 via the interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The storage device 106 also includes volatile memory 112, which may be used by controller 108 to store information. Volatile memory 112 may be comprised of one or more volatile memory devices. In some examples, the controller 108 may use volatile memory 112 as a cache. For instance, the controller 108 may store cached information in volatile memory 112 until cached information is written to non-volatile memory 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, DDR5, LPDDR5, and the like)).

The various types of volatile memories may be used with different access properties. For example, DRAM may be arranged for longer burst accesses to allow for improved bandwidth (BW) of the same access bus. Alternatively, DRAM may be used with smaller accesses such that random small accesses may have better latency. The controller 108 comprises additional optional SRAM and/or embedded MRAM (not shown). Embedded MRAM is another alternative memory that may be used in another embodiment. Similarly, the access to the MRAM can be optimized for different design purposes, but the quantity of embedded MRAM in the SSD controller 108 may be cost sensitive. Therefore, the choice of how much data and which data goes into the premium non-volatile memory and premium volatile memory will subject to system tradeoffs.

The storage device 106 includes a controller 108, which may manage one or more operations of the storage device 106. For instance, the controller 108 may manage the reading of data from and/or the writing of data to the NVM 110 via a toggle mode (TM) bus (not shown). In some embodiments, when the storage device 106 receives a write command from the host device 104, the controller 108 may initiate a data storage command to store data to the NVM 110 and monitor the progress of the data storage command. The controller 108 may determine at least one operational characteristic of the storage system 100 and store the at least one operational characteristic to the NVM 110. In some embodiments, when the storage device 106 receives a write command from the host device 104, the controller 108 temporarily stores the data associated with the write command in the internal memory before sending the data to the NVM 110. The controller 108 comprises a weight counter table 120, which is used to determine and estimate a susceptibility of errors in the NVM 110, as discussed further below.

Figure 2:
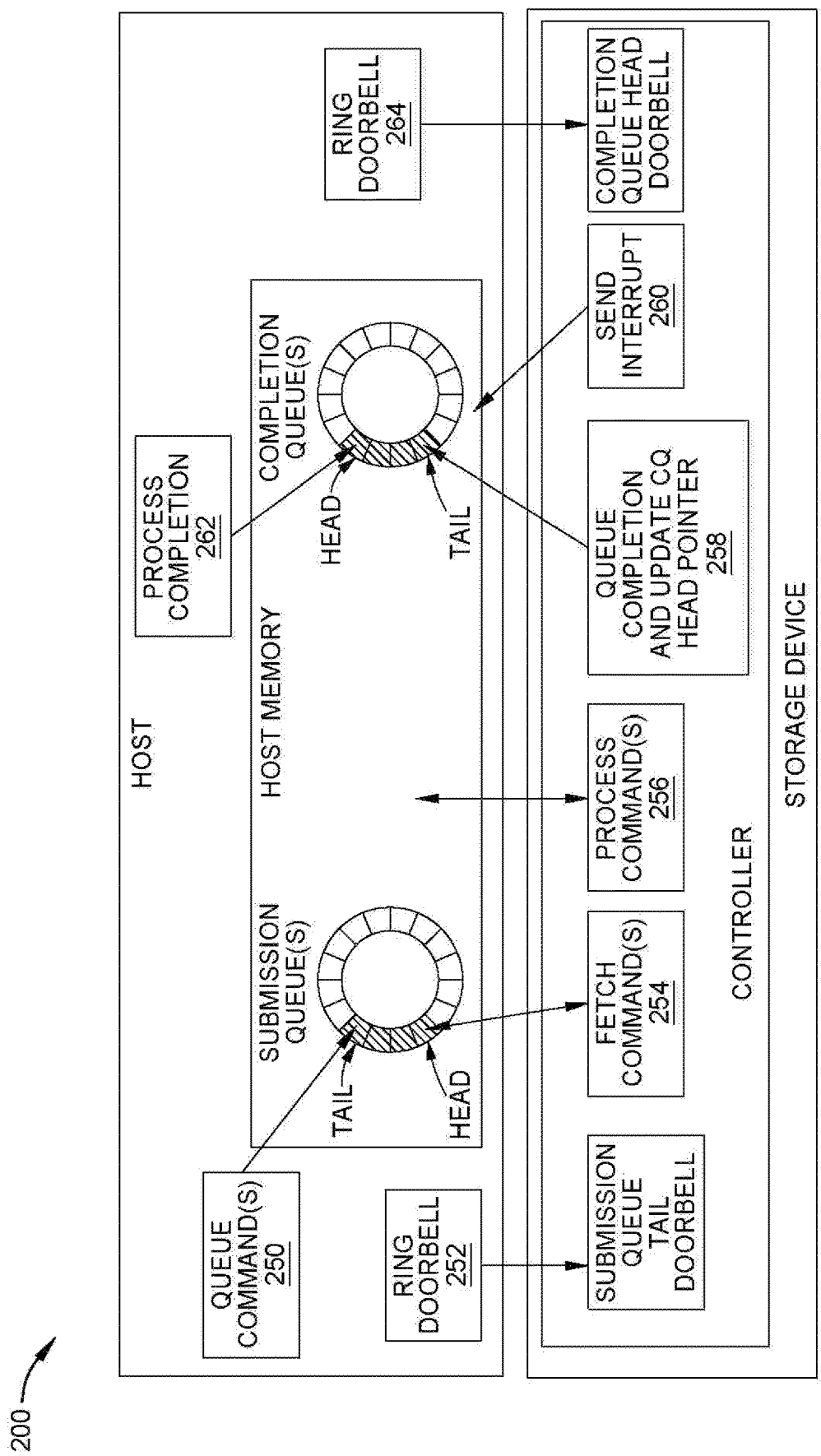
FIG. 2 is a block diagram illustrating a method of operating a storage device to execute a read or write command, according to one embodiment.

FIG. 2 is a block diagram illustrating a method 200 of operating a storage device to execute a read or write command, according to one embodiment. Method 200 may be used with the storage system 100 having a host device 104 and a storage device 106 comprising a controller 108. Method 200 may be used with the device a host device and a storage device comprising a command processor.

Method 200 begins at operation 250, where the host device writes a command into a submission queue as an entry. The host device may write one or more commands into the submission queue at operation 250. The commands may be read commands or write commands. The host device may comprise one or more submission queues. The host device may write one or more commands to the submission queue in any order (i.e., a submission order), regardless of the sequential write order of the one or more commands (i.e., a sequential processing order).

In operation 252, the host device writes one or more updated submission queue tail pointers and rings a doorbell or sends an interrupt signal to notify or signal the storage device of the new command that is ready to be executed. The host may write an updated submission queue tail pointer and send a doorbell or interrupt signal for each of the submission queues if there are more than one submission queues. In operation 254, in response to receiving the doorbell or interrupt signal, a controller of the storage device fetches the command from the one or more submission queue, and the controller receives or DMA reads the command.

In operation 256, the controller processes the command and writes or transfers data associated with the command to the host device memory. The controller may process more than one command at a time. The controller may process one or more commands in the submission order or in the sequential order. Processing a write command may comprise identifying a zone to write the data associated with the command to, writing the data to one or more logical block addresses (LBA) of the zone, and advancing a write pointer of the zone to identify the next available LBA within the zone.

In operation 258, once the command has been fully processed, the controller writes a completion entry corresponding to the executed command to a completion queue of the host device and moves or updates the CQ head pointer to point to the newly written completion entry.

In operation 260, the controller generates and sends an interrupt signal or doorbell to the host device. The interrupt signal indicates that the command has been executed and data associated with the command is available in the memory device. The interrupt signal further notifies the host device that the completion queue is ready to be read or processed.

In operation 262, the host device processes the completion entry. In operation 264, the host device writes an updated CQ head pointer to the storage device and rings the doorbell or sends an interrupt signal to the storage device to release the completion entry.

Figure 3A:
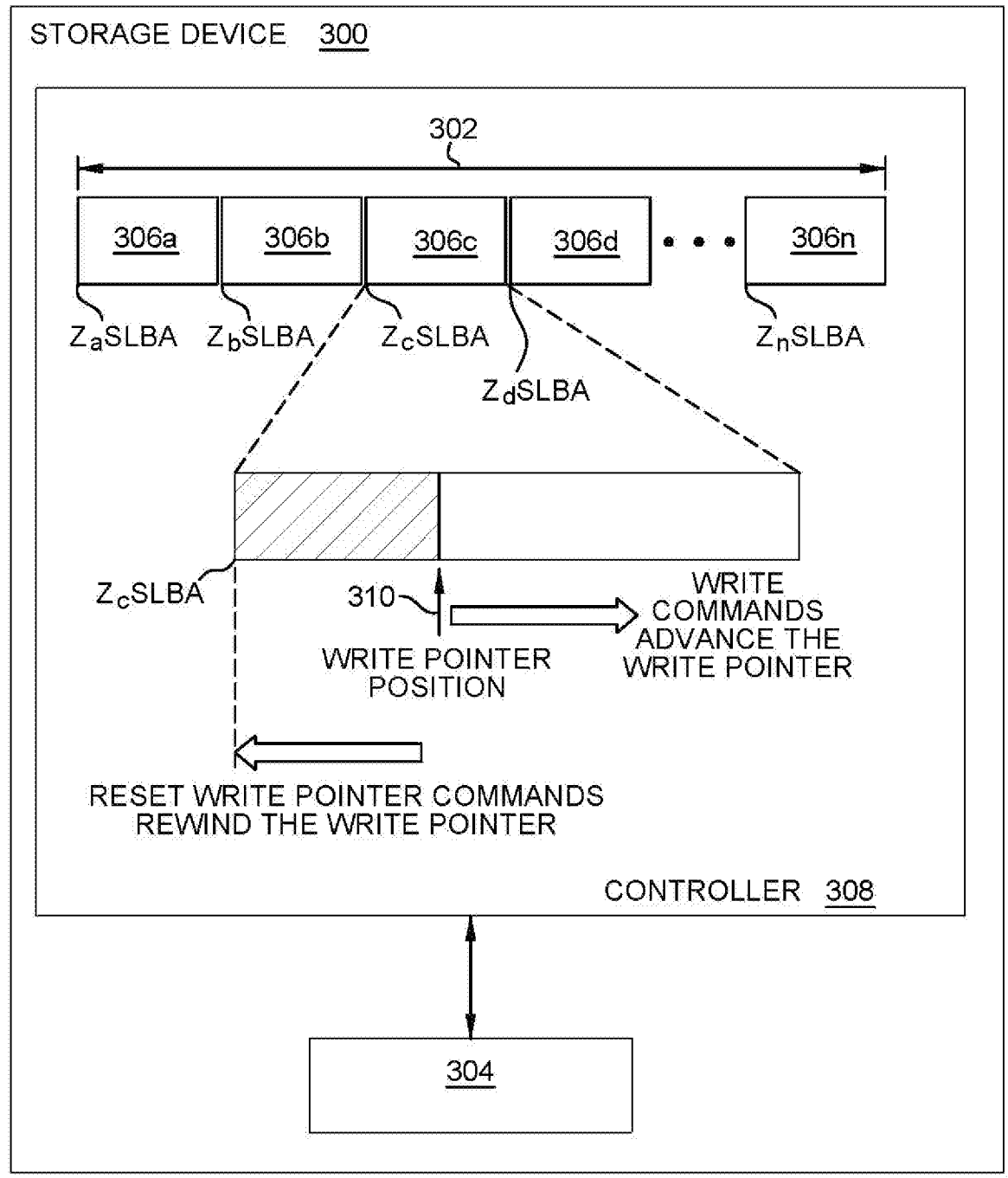
FIG. 3A illustrates a zoned namespaces utilized in a storage device, according to one embodiment.
Figure 3B:
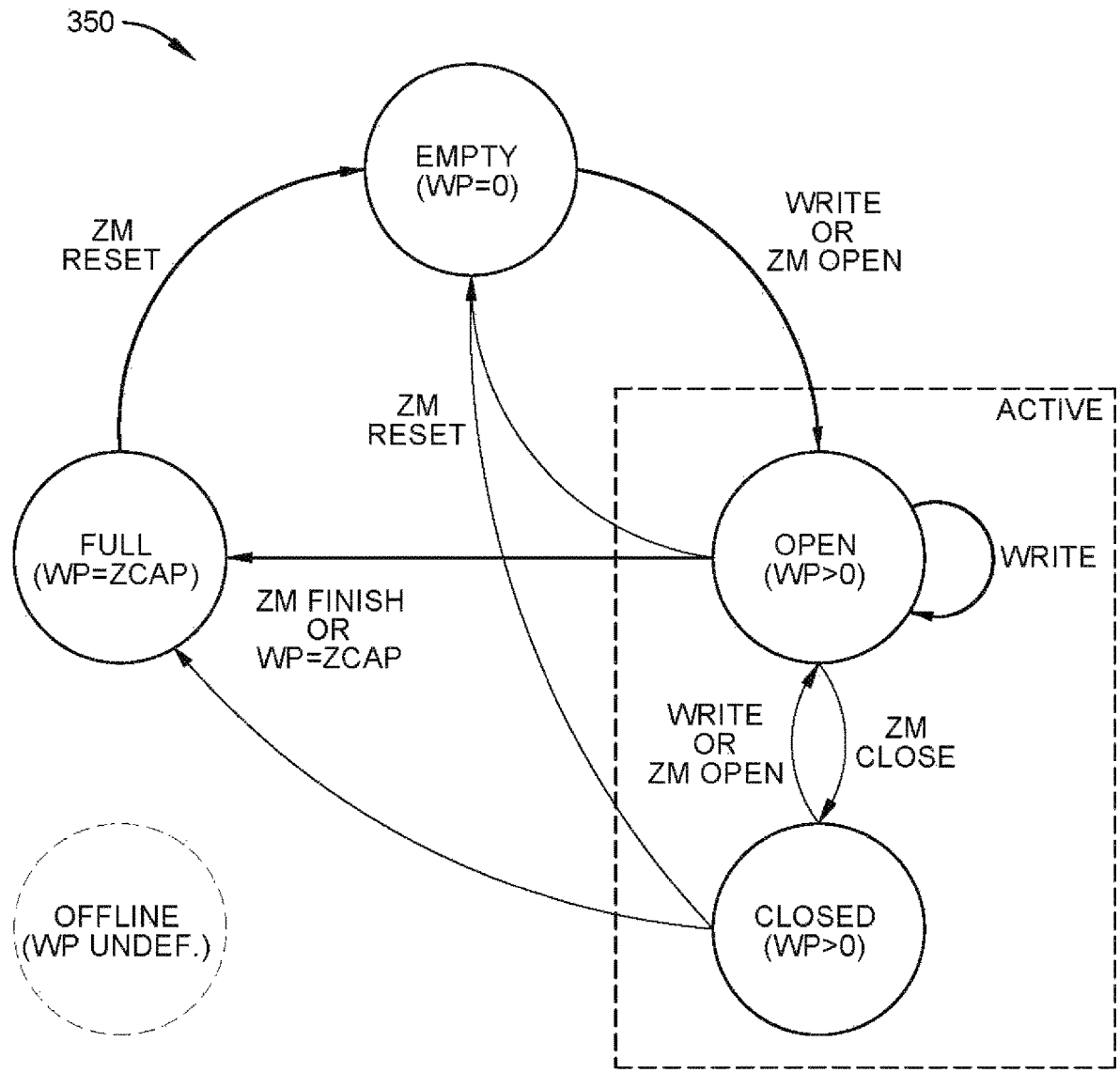
FIG. 3B illustrates a state diagram for the zoned namespaces of the storage device of FIG. 3A, according to one embodiment.

FIG. 3A illustrates a Zoned Namespaces (ZNS) 302 view utilized in a storage device 300, according to one embodiment. The storage device 300 may present the ZNS 302 view to a host device. FIG. 3B illustrates a state diagram 350 for the ZNS 302 of the storage device 300, according to one embodiment. The storage device 300 may be the storage device 106 of the storage system 100 of FIG. 1. The storage device 300 may have one or more ZNS 302, and each ZNS 302 may be different sizes. The storage device 300 may further comprise one or more conventional namespaces in addition to the one or more Zoned Namespaces 302. Moreover, the ZNS 302 may be a zoned block command (ZBC) for SAS and/or a zoned-device ATA command set (ZAC) for SATA. Host side zone activity may be more directly related to media activity in zoned drives due to the relationship of logical to physical activity possible.

In the storage device 300, the ZNS 302 is the quantity of NVM that can be formatted into logical blocks such that the capacity is divided into a plurality of zones 306a-306n (collectively referred to as zones 306). The NVM may be the storage unit or NVM 110 of FIG. 1. Each of the zones 306 comprise a plurality of physical or erase blocks (not shown) of a memory unit or NVM 304, and each of the erase blocks are associated a plurality of logical blocks (not shown). Each of the zones 306 may have a size aligned to the capacity of one or more erase blocks of a NVM or NAND device. When the controller 308 receives a command, such as from a host device (not shown) or the submission queue of a host device, the controller 308 can read data from and write data to the plurality of logical blocks associated with the plurality of erase blocks (EBs) of the ZNS 302. Each of the logical blocks is associated with a unique LBA or sector.

In one embodiment, the NVM 304 is a NAND device. The NAND device comprises one or more dies. Each of the one or more dies comprises one or more planes. Each of the one or more planes comprises one or more erase blocks. Each of the one or more erase blocks comprises one or more wordlines (e.g., 256 wordlines). Each of the one or more wordlines may be addressed in one or more pages. For example, an MLC NAND die may use upper page and lower page to reach the two bits in each cell of the full wordline (e.g., 16 KiB per page). Furthermore, each page can be accessed at a granularity equal to or smaller than the full page. A controller can frequently access NAND in user data granularity LBA sizes of 512 bytes. Thus, as referred to in the below description, NAND locations are equal to a granularity of 512 bytes. As such, an LBA size of 512 bytes and a page size of 16 KiB for two pages of an MLC NAND results in 32 LBAs per wordline. However, the NAND location size is not intended to be limiting, and is merely used as an example.

When data is written to an erase block, one or more logical blocks are correspondingly updated within a zone 306 to track where the data is located within the NVM 304. Data may be written to one zone 306 at a time until a zone 306 is full, or to multiple zones 306 such that multiple zones 306 may be partially full. Similarly, when writing data to a particular zone 306, data may be written to the plurality of erase blocks one block at a time, in sequential order of wordline-by-wordline, until moving to an adjacent block (i.e., write to a first erase block until the first erase block is full before moving to the second erase block), or to multiple blocks at once, in sequential order of wordline-by-wordline, to partially fill each block in a parallel fashion (i.e., writing the first wordline of each erase block before writing to the second wordline of each erase block). This sequential programming of every NAND location is a typical non-limiting requirement of many NAND EBs.

When a controller 308 selects the erase blocks that will store the data for each zone, the controller 308 will be able to choose the erase blocks either at the zone open time, or it may choose the erase blocks as it reaches a need to fill the first wordline of that particular erase block. This may be more differentiating when the above described method of filling one erase block completely prior to starting the next erase block is utilized. The controller 308 may use the time difference to select a more optimal erase block in a just-in-time basis. The decision of which erase block is allocated and assigned for each zone and its contiguous LBAs can be occurring for zero or more concurrent zones at all times within the controller 308.

Each of the zones 306 is associated with a zone starting logical block address (ZSLBA) or zone starting sector. The ZSLBA is the first available LBA in the zone 306. For example, the first zone 306a is associated with ZaSLBA, the second zone 306b is associated with ZbSLBA, the third zone 306c is associated with ZcSLBA, the fourth zone 306d is associated with ZdSLBA, and the nth zone 306n (i.e., the last zone) is associated with ZnSLBA. Each zone 306 is identified by its ZSLBA, and is configured to receive sequential writes (i.e., writing data to the NVM 110 in the order the write commands are received).

As data is written to a zone 306, a write pointer 310 is advanced or updated to point to or to indicate the next available block in the zone 306 to write data to in order to track the next write starting point (i.e., the completion point of the prior write equals the starting point of a subsequent write). Thus, the write pointer 310 indicates where the subsequent write to the zone 306 will begin. Subsequent write commands are 'zone append' commands, where the data associated with the subsequent write command appends to the zone 306 at the location the write pointer 310 is indicating as the next starting point. An ordered list of LBAs within the zone 306 may be stored for write ordering. Each zone 306 may have its own write pointer 310. Thus, when a write command is received, a zone is identified by its ZSLBA, and the write pointer 310 determines where the write of the data begins within the identified zone.

FIG. 3B illustrates a state diagram 350 for the ZNS 302 of FIG. 3A. In the state diagram 350, each zone may be in a different state, such as empty, active, full, or offline. When a zone is empty, the zone is free of data (i.e., none of the erase blocks in the zone are currently storing data) and the write pointer is at the ZSLBA (i.e., WP=0). An empty zone switches to an open and active zone once a write is scheduled to the zone or if the zone open command is issued by the host. Zone management (ZM) commands can be used to move a zone between zone open and zone closed states, which are both active states. If a zone is active, the zone comprises open blocks that may be written to, and the host may be provided a description of recommended time in the active state. The controller 308 comprises the ZM. Zone metadata may be stored in the ZM and/or the controller 308.

The term "written to" includes programming user data on 0 or more NAND locations in an erase block and/or partially filled NAND locations in an erase block when user data has not filled all of the available NAND locations. The term "written to" may further include moving a zone to full due to internal drive handling needs (open block data retention concerns because the bits in error accumulate more quickly on open erase blocks), the storage device 300 closing or filling a zone due to resource constraints, like too many open zones to track or discovered defect state, among others, or a host device closing the zone for concerns such as there being no more data to send the drive, computer shutdown, error handling on the host, limited host resources for tracking, among others.

The active zones may be either open or closed. An open zone is an empty or partially full zone that is ready to be written to and has resources currently allocated. The data received from the host device with a write command or zone append command may be programmed to an open erase block that is not currently filled with prior data. A closed zone is an empty or partially full zone that is not currently receiving writes from the host in an ongoing basis. The movement of a zone from an open state to a closed state allows the controller 308 to reallocate resources to other tasks. These tasks may include, but are not limited to, other zones that are open, other conventional non-zone regions, or other controller needs.

In both the open and closed zones, the write pointer is pointing to a place in the zone somewhere between the ZSLBA and the end of the last LBA of the zone (i.e., WP>0). Active zones may switch between the open and closed states per designation by the ZM, or if a write is scheduled to the zone. Additionally, the ZM may reset an active zone to clear or erase the data stored in the zone such that the zone switches back to an empty zone. Once an active zone is full, the zone switches to the full state. A full zone is one that is completely filled with data, and has no more available sectors or LBAs to write data to (i.e., WP=zone capacity (ZCAP)). In a full zone, the write pointer points to the end of the writeable capacity of the zone. Read commands of data stored in full zones may still be executed.

The zones may have any total capacity, such as 256 MiB or 512 MiB. However, a small portion of each zone may be inaccessible to write data to, but may still be read, such as a portion of each zone storing the parity data and one or more excluded erase blocks. For example, if the total capacity of a zone 306 is 512 MiB, the ZCAP may be 470 MiB, which is the capacity available to write data to, while 42 MiB are unavailable to write data. The writeable capacity (ZCAP) of a zone is equal to or less than the total zone storage capacity. The storage device 300 may determine the ZCAP of each zone upon zone reset. For example, the controller 308 or the ZM may determine the ZCAP of each zone. The storage device 300 may determine the ZCAP of a zone when the zone is reset.

The ZM may reset a full zone, scheduling an erasure of the data stored in the zone such that the zone switches back to an empty zone. When a full zone is reset, the zone may not be immediately cleared of data, though the zone may be marked as an empty zone ready to be written to. However, the reset zone must be erased prior to switching to an open and active zone. A zone may be erased any time between a ZM reset and a ZM open. Upon resetting a zone, the storage device 300 may determine a new ZCAP of the reset zone and update the Writeable ZCAP attribute in the zone metadata. An offline zone is a zone that is unavailable to write data to. An offline zone may be in the full state, the empty state, or in a partially full state without being active.

Since resetting a zone clears or schedules an erasure of all data stored in the zone, the need for garbage collection of individual erase blocks is eliminated, improving the overall garbage collection process of the storage device 300. The storage device 300 may mark one or more erase blocks for erasure. When a new zone is going to be formed and the storage device 300 anticipates a ZM open, the one or more erase blocks marked for erasure may then be erased. The storage device 300 may further decide and create the physical backing of the zone upon erase of the erase blocks. Thus, once the new zone is opened and erase blocks are being selected to form the zone, the erase blocks will have been erased. Moreover, each time a zone is reset, a new order for the LBAs and the write pointer 310 for the zone 306 may be selected, enabling the zone 306 to be tolerant to receive commands out of sequential order. The write pointer 310 may optionally be turned off such that a command may be written to whatever starting LBA is indicated for the command.

Referring back to FIG. 3A, when the host sends a write command to write data to a zone 306, the controller 308 pulls-in the write command and identifies the write command as a write to a newly opened zone 306. The controller 308 selects a set of EBs to store the data associated with the write commands of the newly opened zone 306 to, and the newly opened zone 306 switches to an active zone 306. The write command may be a command to write new data, or a command to move valid data to another zone for garbage collection purposes. The controller 308 is configured to DMA read new commands from a submission queue populated by a host device.

In an empty zone 306 just switched to an active zone 306, the data is assigned to the zone 306 and the associated set of sequential LBAs of the zone 306 starting at the ZSLBA, as the write pointer 310 is indicating the logical block associated with the ZSLBA as the first available logical block. The data may be written to one or more erase blocks or NAND locations that have been allocated for the physical location of the zone 306. After the data associated with the write command has been written to the zone 306, a write pointer 310 is updated to point to the next LBA available for a host write (i.e., the completion point of the first write). The write data from this host write command is programmed sequentially into the next available NAND location in the erase block selected for physical backing of the zone.

For example, the controller 308 may receive a first write command to a third zone 306c, or a first zone append command. The host identifies sequentially which logical block of the zone 306 to write the data associated with the first command to. The data associated with the first command is then written to the first or next available LBA(s) in the third zone 306c as indicated by the write pointer 310, and the write pointer 310 is advanced or updated to point to the next available LBA available for a host write (i.e., WP>0). If the controller 308 receives a second write command to the third zone 306c, or a second zone append command, the data associated with the second write command is written to the next available LBA(s) in the third zone 306c identified by the write pointer 310. Once the data associated with the second command is written to the third zone 306c, the write pointer 310 once again advances or updates to point to the next available LBA available for a host write. Resetting the third zone 306c moves the write pointer 310 back to the ZcSLBA (i.e., WP=0), and the third zone 306c switches to an empty zone.

Figure 4A:
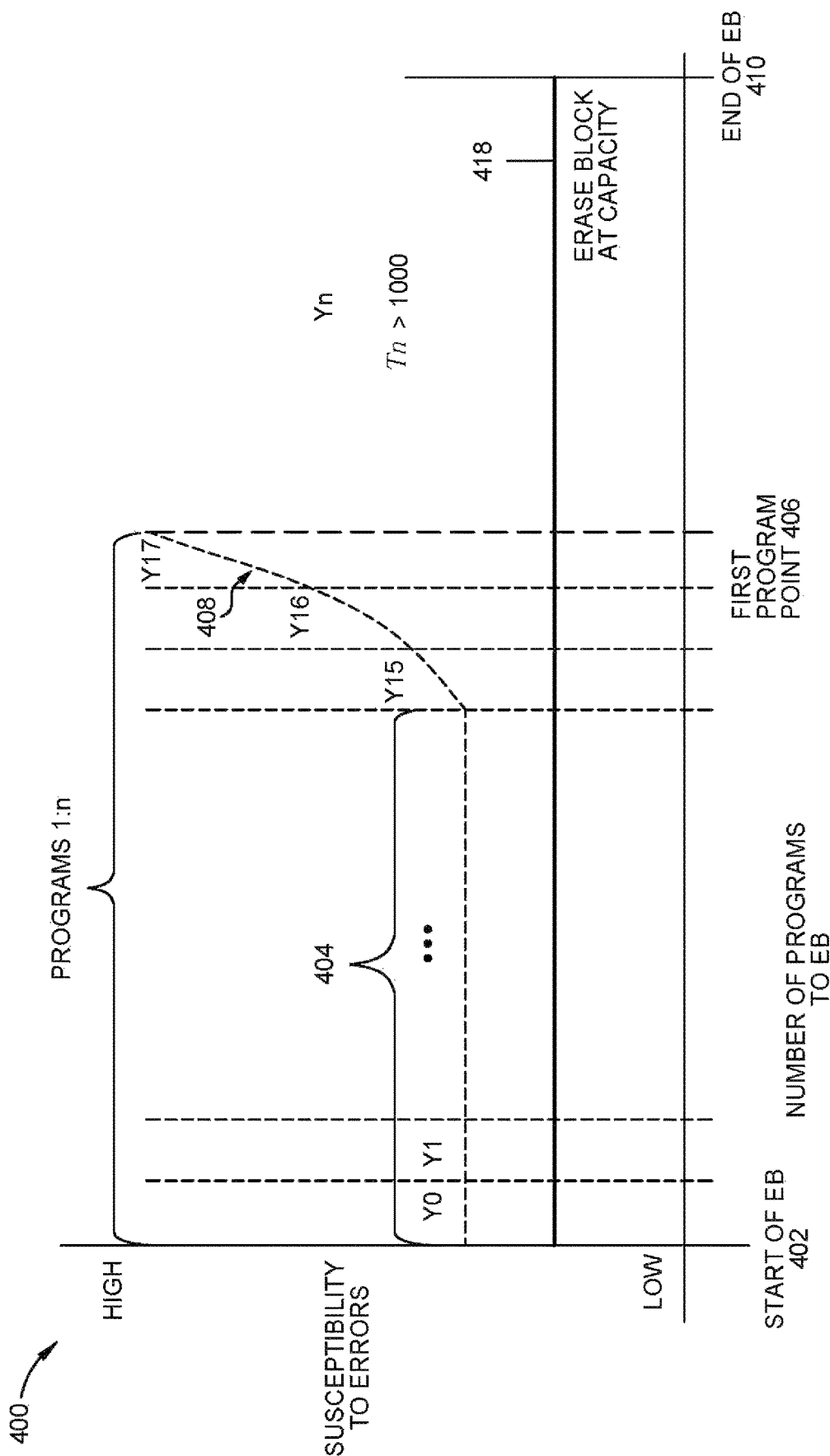
FIG. 4A is a graph illustrating the susceptibility to errors of different bins of an erase block, according to one embodiment.
Figure 5A:
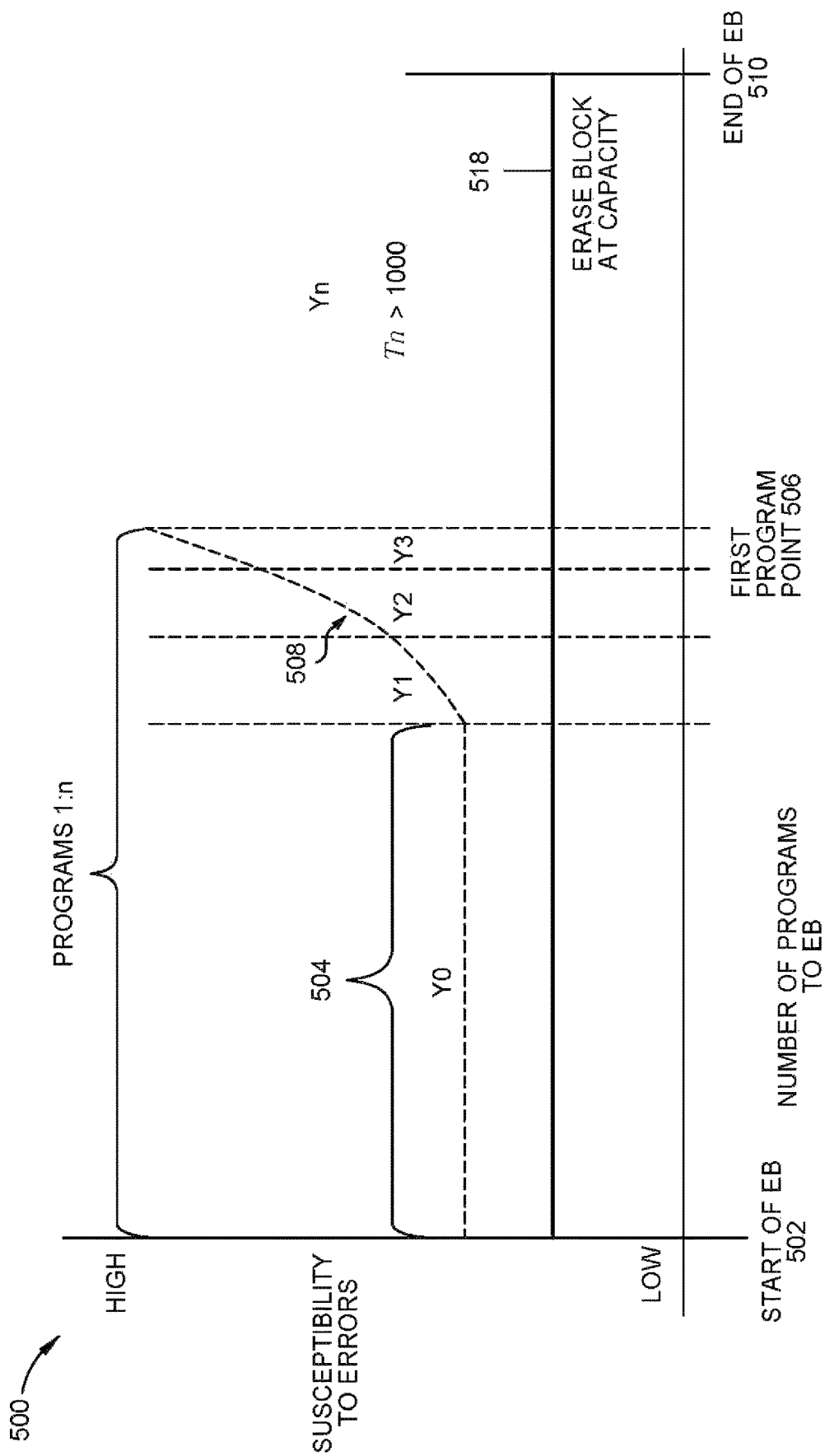
FIG. 5A is a graph illustrating the susceptibility to errors of different bins of an erase block, according to another embodiment.
Figure 6A:
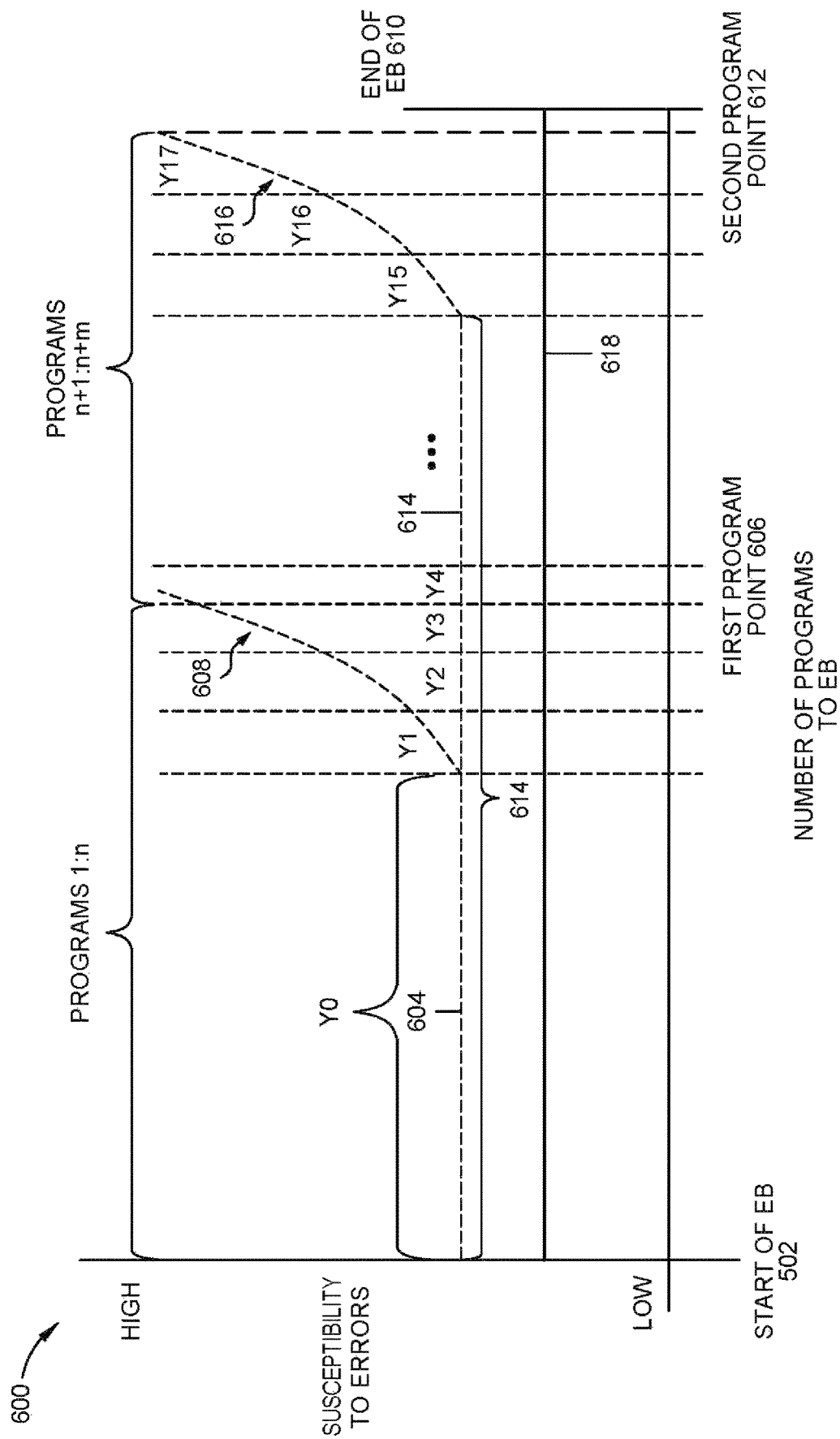
FIG. 6A is a graph illustrating the susceptibility to errors of different bins of an erase block, according to yet another embodiment.

FIGS. 4A, 5A, and 6A are graphs illustrating the susceptibility to errors of different bins of an erase block, according to various embodiments. FIGS. 4B, 5B, and 6B are tables containing various values for the different factors contributing to the bit error susceptibility of an erase block, according to various embodiments. The number of programs to an erase block is on the x-axis and the susceptibility to errors is on the y-axis. The x-axis is scaled from an erase block containing no programmed data to an erase block at capacity. The total number of programs an erase block may contain at capacity is a variable value depending on the program size as well as the size of any associated metadata. In the following descriptions, a non-volatile storage unit may be referenced as a NVM for simplification and exemplary purposes. Moreover, while FIGS. 4A-4C are directed towards an erase block, the same concept may apply to entire zones or entire streams, as discussed below.

Furthermore, the y-axis is scaled from low susceptibility to errors to high susceptibility to errors. The susceptibility to errors is relative and may depend on the type of non-volatile memory. In addition, the scale of low susceptibility and high susceptibility is used to provide an example to further explain the embodiments herein. The curves shown are neither limiting nor restricting and are utilized to provide a possible embodiment of the increasing susceptibility to read errors for increasing writes to an erase block.

An erase block may have a total capacity of 256 wordlines, however, the erase block may have more than or less than 256 wordlines. Data is written sequentially to a wordline in a first erase block of a first zone utilizing a write pointer, such as the pointer 310 of FIG. 3A. When all wordlines are written to in the first erase block, the first erase block may be closed (i.e., every wordline (WL) in an erase block (EB) has been programmed, such that each cell is programmed with a non-erased value). When a new write command is received, a second erase block may be appropriated for the new write data. Similar to an open and active zone, such as the open and active zone described in FIG. 3B, an open erase block is an erase block that has been partially programmed.

In one embodiment, data is written to a first wordline in a first erase block of each plane of each die within a first zone. Data is written sequentially filling each wordline of the first erase block of each plane of each die within a first zone. Once the first erase block of each plane of each die is filled, data is written to a second erase block of each plane of each die, and so on. In another embodiment, erase blocks are entirely programmed from top to bottom (i.e., from the first wordline to the last wordline) before moving on to program another erase block. In such an embodiment, the ZCAP, such as the ZCAP described in FIG. 3B, may dynamically shrink due to filling individual erase blocks to capacity, such that the previous ZCAP is equal to the current ZCAP minus one or more closed erase blocks.

However, an erase block may be closed before the erase block is at capacity due to reaching a predetermined read error susceptibility value. The predetermined read susceptibility value may be about 1000 to about 2000. The values for the predetermined read error susceptibility value are not intended to be limiting nor restricting, but to provide an example of a possible value. In one embodiment, the predetermined read error susceptibility value is determined when then erase block is first opened. In another embodiment, the predetermined read error susceptibility value is dynamically changing based on the current conditions, such as the current predetermined read error susceptibility and/or the current number of reads to a certain section of the erase block. In yet another embodiment, the storage device may switch the placement of user data received from the host temporarily and implement a real-time test to determine a new read error susceptibility value. As such, the predetermined read error susceptibility value may change, rather than being a set, constant value.

For the following examples, the data written to an erase block has a size equal to a wordline. In the examples herein, an erase block contains 256 wordlines. The values presented for the data write size and the size of an erase block are not intended to be limiting. The use of the term "wordline" throughout the following embodiments is not intended to be limiting, but to provide a possible example to aid in the explanation of some of the possible embodiments. Data may be written to an erase block or a zone in a size greater than or less than a wordline, as discussed above.

The correlated bit error accumulation on a wordline within an open erase block reduces as the shared circuitry for programming and reading are further separated in the NAND die layout. This separation of circuitry allows for electrical behaviors to be more isolate, such as crosstalk and leakage to the components. This correlation may be related to the wordline numbering available for addressing the physical media; however, the correlation between the wordline numbering and the separation of circuitry is not always required.

One or more wordlines in each zone of the plurality of zones are grouped together into bins. The wordlines may be separated by the program time frame into the various bins, or by an estimated susceptibility to errors (i.e., wordlines with similar error susceptibility are grouped together in a bin). For example, wordlines programmed around the same time may be grouped together in a bin. An erase block may have a singular bin or a plurality of bins. Each bin may comprise one or more wordlines. Each bin may have the same number of wordlines or have differing amounts of wordlines. In the embodiment where a bin comprises a plurality of wordlines, the wordlines of the bin are sequential or consecutive.

Bins are sequentially written to within an erase block utilizing a write pointer, such as pointer 310 of FIG. 3A. Furthermore, each bin is associated with a susceptibility weight (Sw), a read count weight (Rc), a timer count weight (Y_bin n), and a running total weight (Tn). The notation "n" refers to the position that a bin is located in within the totality of bins within an erase block. Unlike writing data to a bin, where writes occur sequentially, read commands to read data may occur non-sequentially with an erase block.

A first program point comprises all the data currently written to an erase block, such that the first program point signifies the last programmed bin. The probability of accumulating an error during a read to a bin further from the first program point (i.e., closer to the start of the erase block) is generally less than a read to a bin closer to the first program point. For example, a first program point may comprise data stored in 10 bins, where a read command to the latter bins (i.e., nearest to the first program point 406) has a higher error susceptibility probability than a read command to the first bins (i.e., nearest to the start of the EB 402). The error susceptibility probability is set to various values denoted by the susceptibility weight, where a lower susceptibility weight refers to a lower error susceptibility probability and a higher susceptibility weight refers to a higher error susceptibility probability. Each bin may have the same susceptibility weight as another bin or a different susceptibility weight from other bins. Furthermore, in one embodiment, each susceptibility weight is associated with a singular bin. In another embodiment, a susceptibility weight may be associated with multiple bins.

Each time one or more read commands are received to read data from a bin, the read count for the corresponding bin (e.g., a read command for wordline 5 may correspond to bin 1 (Y1)) increases by 1 for each read command. An increase in the read count increases the read weight count, and thus, increases the running total weight, and the weight counter table 120 of FIG. 1 is updated. The timer count weight refers to the weight associated with the time that a bin storing data within an open erase block has been open. A controller, such as the controller 108 of FIG. 1, has an internal timer or clock to keep track of the time each bin has been opened.

When an erase block is open and partially written to (i.e., is not at capacity), bit errors may accumulate. An equation such as x=(threshold)/(time), where x refers to bit errors per time step, may be used to estimate how many errors are associated with each bin being open. The threshold is the predetermined value associated with an unacceptable quantity of bit error accumulation. When the predetermined value is exceeded, the erase block is closed by writing padded data or dummy data to fill the erase block to capacity. The time refers to the amount of time (in seconds) that a bin can be open before bit errors have accumulated.

For example, if a bin has a maximum open time of 7 days and the threshold is 1000, then the errors per second accumulated is calculated as follows: x=1000/(7 days*24 hrs/day*60 mins/hr*60 min/hr*60 sec/min)=2.756E-5 bits/sec. Each time a predetermined amount of time passes, such as about one second or about 5 seconds, the timer count weight increases, increasing the running total weight, and the weight counter table 120 of FIG. 1 is updated.

In one embodiment, the timer count weight and the read count weight are coupled, such that both affect the running total weight. In another embodiment, the timer count weight and the read count weight are uncoupled or utilized individually, such that the timer count weight is associated with a first running total weight and the read count weight is associated with a second running total weight. Each running total weight is tracked so that when either a first running total weight or a second running total weight reaches the predetermined read error susceptibility error, the controller is configured to close the erase block.

The controller, such as the controller 108 of FIG. 1, may indicate to the host, such as the host 104 of FIG. 1, a zone finished recommended signal, such that the host is warned that the erase block or the zone is nearing the predetermined read error susceptibility value. The controller 108 may issue an event which informs the host device 104 that the zone or the erase block conditions have changed. The host device 104 should then retrieve a list of changes and perform any mitigations that the host device deems necessary, such as closing the zone or erase block by writing pad data or dummy data to fill the remaining capacity of the zone or the erase block.

The running total weight symbolizes the overall susceptibility to errors of a bin utilizing the susceptibility weight, the read count weight, and the timer count weight of each bin. Each time the susceptibility weight, the read count, and the timer count weight of each bin is updated, the controller 108 updates the weight counter table 120 of FIG. 1. A higher running total weight refers to a higher level of susceptibility to errors and a lower running total weight refers to a lower level of susceptibility to errors. A recently written bin may have a running total weight lower than that of the previously written bin, as the recently written bin will have smaller timer count weight and/or a read count weight contributions. For example, if the current program point is bin 6 and a new write command is received to write bin 7 to the erase block, bin 7 may have a lower running total weight than bin 6. The lower running total weight may be due to a significantly lower timer weight count or read count, even though the susceptibility weight may be higher.

The running total weight per bin is calculated utilizing the following equation: (Running total weight)=(susceptibility weight)*(read count weight)*(timer count weight)+(previous running total weight). The previous running total weight is applicable when the running total weight is calculated at every time step. However, when an instantaneous running total weight is calculated, the "previous running total weight" is 0. The running total weight of each bin may be accumulated to determine whether the predetermined value is met or exceeded.

When the running total weight of any bin, or the sum of each bin, reaches or exceeds a predetermined value, such as about 1000, the erase block is closed. When the controller determines that an erase block needs to be closed, the erase block is filled to capacity with pad or dummy data. Alternatively, an erase block is closed when the writeable capacity of the erase block is filled with data. A closed erase block has a decreased overall error susceptibility when compared to an open erase block. The predetermined value, susceptibility weight values, timer count weight values, and running total weight values mentioned herein are not intended to be limiting, but to provide examples of possible embodiments. Furthermore, the curves shown are not all encompassing, and other curves representing the susceptibility of error due to reads to an erase block may exist.

FIG. 4A is a graph 400 illustrating the susceptibility to errors of different bins of an erase block, according to one embodiment. FIG. 4B is a weight table 450 corresponding to FIG. 4A, according to one embodiment. The weight table 450 comprises columns for bin numbers, a number of wordlines in each bin, a susceptibility weight of each bin, a read count weight of each bin, a timer count weight of each bin, and the running total weight of each bin. The weight table 450 may be the weight counter table 120 of FIG. 1.

One or more first commands are received to write data to partially fill a first erase block of a first zone. The first erase block may comprise previously written data, such as 10 wordlines grouped together into a single bin Y0, in which case the data associated with the one or more first commands is written to the next available sequential locations in the erase block. Bins Y1-Y17 may comprise of the data of the one or more first write commands. In the example of FIGS. 4A-4B, each bin, Y0-Y17, is comprised of 10 wordlines each. Thus, the first erase block may comprise 25 total bins of wordlines storing user data, and the remaining wordlines may be utilized to store metadata, including a logical-to-physical address table, for example. Furthermore, as shown in FIG. 4A, the first erase block is partially full, with 18 bins currently storing user data.

Bins, and thus read commands to the bins, are associated with a susceptibility weight dependent on the location of the data within the erase block. Bins closer to the first program point 406 or current program point have a higher susceptibility weight associated with the data. However, bins closer to the start of the erase block 402 have a lower susceptibility weight. For example, first read commands to bins Y0 and Y1 have a susceptibility weight of about 0.5 (indicated by the first straight line portion 404), while a second read command to one or more bins Y15, Y16, or Y17 has a higher susceptibility weight, for example, bin Y15 has a susceptibility weight of about 1, bin Y16 has a susceptibility weight of about 2, and bin Y17 has a susceptibility weight of about 3 (indicated by the first curved portion 408). The susceptibility weight of about 3 for bin Y17 indicates that any read to the data located in bin Y17 has a higher susceptibility to error than a read to the data in located in bin Y16 or lower. In addition, the read commands received may be to read data non-sequentially. For example, a first read command may be to read data in bin Y15, a second read command may be to read data in bin Y1, and a third read command may be to read data in Y16.

The weight table 450 of FIG. 4B is an example of possible susceptibility weight values, read count values, timer count weight values, and running total weight values that each bin of FIG. 4A may have. Each time a read command is received to read data from a bin, the read count increases, thus increasing the running total weight of the bin. For example, if a second read command to read data in bin Y17 is received, the read count increases from a first read count associated with a first read command of 19 to a second read count associated with the second read command of 20. The resulting running total weight is increased from 285 to 300 (e.g., Sw of 3*Rc of 20*Y_bin_n of 5).

After a predetermined amount of time has passed or a time step has advanced, the timer count weight of each bin may increase, as discussed above, thus increasing the running total weight of each bin. For example, if one iteration of the predetermined time has passed (i.e., one time step) for bin Y1, the timer count weight may increase from 15 to 16. The resulting running total weight is increased from 15 to 16. However, the time step interval affects each bin of the erase block currently programmed (i.e., timer count weight increases by 1 for each of bins Y0-Y17).

Furthermore, if a first read command is received to read data from bin Y0, the read count associated with bin Y0 increases. The result is an increased running total weight for bin Y0. When a second read command is received to read data from bin Y15, the read count of bin Y15 is increased, resulting in an increased running total weight for bin Y15. If a third read command is received to read data from bin Y0, then the read count of bin Y0 is increased again, resulting in an increased running total weight for bin Y0. Each time the predetermined amount of time, such as one second, has expired, the timer count weight (Y_bin_n) for each bin increases. Therefore, the running total weight for bins Y0-Y16 increases at each time step interval as well as for each read command received to read data from a bin.

When the running total weight for one or more bins summed together equals or exceeds a predetermined value, such as about 1000, due to a change in the susceptibility weight, read count, and/or timer count weight of a bin, the controller closes the erase block due to the high possibility of an unacceptable bit error accumulation. For example, if the running total weight values from FIG. 4B for bins Y0-Y17 are summed to be equal or greater than 1000, the erase block will be closed after bin Y17 at the first program point 406. The controller recognizes that the predetermined value has been reached and will close the erase block by filling the empty capacity with pad or dummy data.

The erase block is closed by filling the open capacity with pad or dummy data. The susceptibility of read disturb errors are diminished in a closed or at capacity erase block because the neighboring wordlines are no longer being programmed. When a neighboring wordline or bin is being programmed, the voltage applied to the currently programmed wordline or bin may affect the voltage of the previously programmed wordline or bin, which may lead to bit errors. Thus, the final write to a final wordline in the last bin in an erase block locks down the bit error susceptibility, which may result in a singular closed erase block read error susceptibility section 418, where each bin has the same susceptibility weight.

Read commands may still be received to read data in an erase block that was closed due to being filled to the writeable capacity (i.e., to the end of the EB 410). As shown in FIG. 4A, the closed erase block capacity section 418 has a lower susceptibility than all of the susceptibilities of the previously open bins when the first erase block was open. Thus, when an erase block is closed due to being filled to the writeable capacity, the read weight of any read commands received are lower, such as about 0.25. When the sum of the running total weights of the bins in a closed erase block reaches or exceeds the predetermined value, such as about 1000, the data in the first erase block may be re-written to a second erase block. By weighting the read commands, the erase block may be open longer than with conventional methods, allowing for better usage of the erase block while extending the life of the erase block. Thus, the overall life of the memory unit or storage device may be extended since the erase blocks are better utilized.

FIG. 5A is a graph 500 illustrating the susceptibility to errors of different bins of an erase block, according to another embodiment. FIG. 5B is a weight table 550 corresponding to FIG. 5A, according to another embodiment. The weight table 550 comprises columns for bin numbers, a number of wordlines in each bin, a susceptibility weight of each bin, a read count weight of each bin, a timer count weight of each bin, and the running total weight of each bin. The weight table 550 may be the weight counter table 120 of FIG. 1.

One or more first write commands are received to write data to partially fill a first erase block of a first zone. The erase block may comprise previously written data, such as 100 wordlines grouped together into a single bin Y0, in which case the data associated with one or more first commands is written to the next available sequential locations in the erase block. Bins Y1-Y3 may comprise the data associated with the one or more first write commands. Since bin Y0 was previously written, the timer count weight will be higher for bin Y0 than for bins Y1-Y3. In the example of FIGS. 5A-5B, each bin, Y0-Y3, may be comprised of a different quantity of wordlines. For example, bin Y0 is comprised of 100 wordlines, bin Y1 comprises 23 wordlines, bin Y2 comprises 14 wordlines, and bin Y3 comprises 6 wordlines. Each bin Y0-Y3 may comprise a different amount of wordlines due to the time the individual wordlines were programmed, or due to a susceptibility of errors estimated for each wordline (i.e., wordlines with similar error susceptibility are grouped together in a bin).

Bins closer to the first program point 506 or current program point have a higher susceptibility weight associated with the data. However, bins closer to the start of the erase block 502 have a lower susceptibility weight. For example, first read commands to bin Y0 have a susceptibility weight of about 0.5 (indicated by the first straight line portion 504), while a second read command to one or more bins Y1, Y2, or Y3 have a higher susceptibility weight, for example, bin Y1 has a susceptibility weight of about 1, bin Y2 has a susceptibility weight of about 2, and bin Y3 has a susceptibility weight of about 3 (indicated by the first curved portion 508). The susceptibility weight of about 3 for bin Y3 indicates that any read to the data located in bin Y3 has a higher susceptibility to error than a read to the data in located in bin Y2 or lower.

The weight table 550 of FIG. 5B is an example of possible susceptibility weight values, read count values, timer count weight values, and running total weight values that each bin of FIG. 5A may have. Each time a read command is associated with a bin, the read count increases. For example, if a second read command to read data in bin Y3 is received, the read count increases from a first read count associated with a first read command of 11 to a second read count associated with the second read command of 12. The resulting running total weight is increased from 66 to 72 (e.g., Sw of 3*Rc of 12*Y_bin_n of 2).

After a predetermined amount of time has passed or a time step has advanced, the timer count weight may increase. For example, if two iterations of the predetermined time has passed (i.e., two time steps) for bin Y1, the timer count weight may increase from 17 to 19. The resulting running total weight is increased from 391 to 437. However, the time step interval affects each bin programmed in the erase block (i.e., timer count weight increases by 2 for each of bins Y0-Y3). Additionally, if a first read command is received to read data from bin Y0, the read count associated with bin Y0 increases. The result is an increased running total weight for bin Y0. If a second read command is received to read data from bin Y0, then the read count of bin Y0 is increased yet again, resulting an increased running total weight for a first bin Y0. Therefore, the running total weight for bins Y0-Y3 increases at each time step interval as well as each time a read command is received to read data from a bin.

When the running total weight for one or more bins summed together equals or exceeds a predetermined value, such as about 1000, due to a change in the susceptibility weight, read count, and/or timer count weight of a bin, the controller closes the first erase block due to the high probability of an unacceptable bit error accumulation. For example, if the running total weight values from FIG. 5B for bins Y0-Y3 are summed together, the resulting running total weight is 689.5. However, if the sum of the bins exceeds the predetermined value of about 1000, the erase block will be closed after bin Y3 at the first program point 506.

The erase block is closed by filling the open capacity with pad or dummy data. The susceptibility of read disturb errors are diminished in a closed or at capacity erase block because the neighboring wordlines are no longer being programmed. Read commands may still be received to read data in an erase block that was closed due to being filled to the writeable capacity (i.e., to the end of the EB 510). As shown in FIG. 5A, the closed erase block capacity section 518 has a lower susceptibility than all of the susceptibilities of the previously open bins when the first erase block was open. Thus, when an erase block is closed due to being filled to the writeable capacity, the read weight of any read commands received are lower, such as about 0.25. When the sum of the running total weights of the bins in a closed erase block reaches or exceeds the predetermined value, such as about 1000, the data in the first erase block may be re-written to a second erase block.

FIG. 6A is a graph 600 illustrating the susceptibility to errors of different bins of an erase block, according to yet another embodiment. FIGS. 6B-6C illustrate a weight table 650 corresponding to FIG. 6A, according to various embodiments. The weight table 650 comprises columns for bin numbers, a number of wordlines in each bin, a susceptibility weight of each bin, a read count weight of each bin, a timer count weight of each bin, a previous running total weight Pw, and the running total weight of each bin. The weight table 650 may be the weight counter table 120 of FIG. 1.

One or more first commands, indicated by a first program point 606, are received to write data to partially fill a first erase block of a first zone. The first erase block may comprise previously written data, such as 40 wordlines grouped together into bin Y0, in which case the data associated with one or more first commands is written to the next available sequential location in the erase block. Bins Y1-Y3 may comprise the data associated with the one or more first write commands. Each bin, Y0-Y3, may be comprised of a different quantity of wordlines. In the example of FIGS. 6A-6B, bin Y0 is comprised of 75 wordlines, bin Y1 comprises 35 wordlines, bin Y2 comprises 25 wordlines, and bin Y3 comprises 10 wordlines.

As shown in the weight table of FIG. 6B, bin Y3, which is nearest to the first program point 606, has the highest susceptibility weight, as shown by the first curved portion 608, while bin Y0, which is nearest to the start of the erase block 602, has the lower susceptibility weight, as shown by the first straight line portion 604. For example, bin Y0 has a susceptibility weight of 0.5, bin Y1 has a susceptibility weight of 1, bin Y2 has a susceptibility weight of 2, and bin Y3 has a susceptibility weight of 3.

As discussed above, each time a read command is received to read data from a bin, the read count increases. For example, if a second read command associated with data in bin Y3 is received, the read count increases from a first read count associated with a first read command of 0 to 1. The resulting running total weight is increased from 0 to 30. After a predetermined amount of time has passed or a time step has advanced, the timer count weight may increase. For example, if three iterations of the predetermined time has passed (i.e., three time steps) for bin Y0, the timer count weight may increase from 25 to 28. The resulting running total weight is increased from 25 to 28. However, the time step interval affects each bin, Y0-Y3, programmed in the erase block (i.e., the timer count weight increases by 3 for each of bins Y0-Y3).

One or more second write commands are then received by a controller, such as the controller 108 of FIG. 1. Data is written sequentially to the first erase block after the first program point 606 to a second program point 612. The data associated with the one or more second write commands partially fills the first erase block such that the first erase block is not written to capacity or to the end of the erase block 610. The second program point 612 refers to the last programmed bin of the first erase block. Bins Y4-Y17 may comprise the data associated with the one or more second write commands.

However, if the one or more second write commands were comprised of the sufficient quantity of wordlines to fill the erase block 610 to capacity (i.e., all 256 wordlines are programmed) and the running total weight for one or more bins summed together is less than the predetermined value of about 1000, the controller will close the erase block 610 due to a full erase block capacity. The data associated with a third write command (i.e., next write command) is written to the second erase block. As discussed above, read commands may still be received to read data in an erase block that was closed due to being filled to the writeable capacity (i.e., to the end of the EB 610). As shown in FIG. 6A, the closed erase block capacity section 618 has a lower susceptibility than all of the susceptibilities of the previously open bins when the first erase block was open. Thus, when an erase block is closed due to being filled to the writeable capacity, the read weight of any read commands received are lower, such as about 0.25.

Prior to receiving the one or more second write commands, the susceptibility weights of bins Y0, Y1, Y2, and Y3 at the first program point 606 varied between 0.5 to 3 (shown by the first straight line portion 604 and the first curved portion 608). However, upon writing the data associated with the one or more second write commands to bins Y4-Y17, the susceptibility weight of bins Y0-Y3 lowers to 0.5, shown by the second straight line portion 614 and in the weight table 650 of FIG. 6C, as bins Y0-Y3 are now further from the second program point 612. Thus, the first curved portion 608 is no longer included, as the data stored in bins Y1-Y3 is now less susceptible to errors. Furthermore, a newly written bin, such as bin Y16, may have a running total weight less than that of a previously written bin, such as Y3, though the newly written bin may have a higher susceptibility weight. The lower running total weight of the newly written bin may be attributed to a significantly lower timer count weight as well as read count than that of the previously written bin.

The second straight line portion 614 encompasses the first straight line portion 604 and is comprised of the bins between bin Y0 and bin Y14 (not all shown). The second straight line portion 614 has a susceptibility weight of 0.5.

In the second curved portion 616, bin Y15 has a susceptibility weight of 1, bin Y16 has a susceptibility weight of 2, and bin Y17 has a susceptibility weight of 3, as further shown in the weight table 650 of FIG. 6C. Thus, after one or more read commands are received to read data in bins Y0-Y17, and as the predetermined amount of time passes or the time step advances, the running total weight count of each bin is increase in the weight table 650 of FIG. 6C.

However, upon adjusting or updating one or more susceptibility weights of the bins, the current read count weight is denoted as a previous running total weight for each bin. Thus, once the susceptibility weight of bins Y1-Y3 were updated to 0.5 to reflect their lower error susceptibility, the current read count weight of each of the bins is denoted as the previous running total weight to be factored into the running total read count weight. Thus, upon receiving one or more read commands to data within a bin, the running total weight is calculated utilizing the following equation: (Running total weight)=(susceptibility weight)*(read count weight)*(timer count weight)+(previous running total weight). For example, as shown in FIG. 6C, 2 additional read commands have been received to read data from each of bins Y0, Y1, and Y2. Thus, the running total weight of bin Y0 is Sw of 0.5*Rc of 2*Y_bin_n of 40+Pw of 25=65. The running total weight of bin Y1 is Sw of 0.5*Rc of 2*Y_bin_n of 30+Pw of 90=120. The running total weight of bin Y2 is Sw of 0.5*Rc of 2*Y_bin_n of 25+Pw of 20=45.

When the running total weight for one or more bins summed together equals or exceeds a predetermined value, such as about 1000, due to a change in the susceptibility weight, read count, and/or timer count weight of a bin, the controller closes the first erase block due to the high possibility of an unacceptable bit error accumulation. For example, if the values from FIG. 6C for bins Y0-Y17 are summed and the resulting running total weight is greater than 1000, then the erase block will be closed after bin Y17 at the second program point 612. The controller recognizes that the predetermined value has been reached and will close the erase block by filling the empty capacity with pad or dummy data.

The erase block is closed by filling the open capacity of the first erase block with pad or dummy data. The susceptibility of read disturb errors are diminished in a closed or at capacity erase block because the neighboring wordlines or bins are no longer being programmed. When a neighboring wordline or bin is being programmed, the voltage applied to the currently programmed wordline or bin may affect the voltage of the previously programmed wordline or bin, which may lead to bit errors. Thus, the final write to a final wordline in the last bin in an erase block locks down the bit error susceptibility, which may result in a singular read error susceptibility section 618, where each bin has the same susceptibility weight. By weighting the read commands, the erase block may be open longer than with conventional methods, allowing for better usage of the erase block while extending the life of the erase block. Thus, the overall life of the memory unit or storage device may be extended since the erase blocks are better utilized.

Wordlines in an erase block are grouped together into bins. The bins have an associated susceptibility weight, read count weight, timer count weight, and a running total weight that estimate the susceptibility to bit error accumulation. The higher susceptibility weight, higher read count weight, higher timer count, and higher running total weight describes an erase block that has a high susceptibility to bit error accumulation. Accumulation of an unfavorable quantity of bit errors may lead to data corruption or data loss, thus decreasing the operations of a memory unit. By utilizing a weighting system (i.e., susceptibility weight, read count weight, timer count weight, and a running total weight), the life and operation of the memory unit may be improved by not prematurely closing an erase block or allowing an erase block to accumulate an unacceptable amount of errors.

In one embodiment, a storage device comprises a non-volatile storage unit. The capacity of the non-volatile storage unit is divided into a plurality of zones. The non-volatile storage unit comprises a plurality of dies and each of the plurality of dies comprising a plurality of erase blocks. The storage device further comprises a controller coupled to the non-volatile storage unit. The controller is configured to write data associated with one or more first commands to a partially full first erase block of a first zone of the plurality of zones sequentially, where the first erase block having a writeable capacity. The data associated with the one or more first commands partially fills the first erase block to a first program point less than the writeable capacity. The controller is further configured to receive one or more read commands to read the data from the first erase block non-sequentially. Each of the one or more read commands is associated with a weight and at least two weights of the one or more read commands are different. The weights are based on a closeness of the data being read to the first program point and an amount of time the first erase block has been open.

The weights increase each time a predetermined amount of time has passed. The controller is configured to close the first erase block when a sum of the weights associated with the one or more read commands accumulates to a predetermined value. The weight of a read command is higher the closer the read command is to the first program point, and wherein the weights indicate a level of susceptibility to errors. The controller is further configured to write data associated with one or more second commands to the first erase block sequentially, wherein the data associated with the one or more second commands partially fills the first erase block to a second program point less than the writeable capacity. The controller is also configured to receive one or more second read commands to read the data from the first erase block non-sequentially, wherein each of the one or more second read commands is associated with a weight, wherein at least two weights of the one or more read second commands are different, and wherein the weights based on a closeness of the data being read to the second program point and the amount of time the first erase block has been open. The first erase block comprises a plurality of wordlines. The plurality of wordlines is divided into one or more bins, wherein the data associated with the one or more first commands is stored in a first bin and the data associated with the one or more second commands is stored in a second bin. The first bin is associated with a first weight and the second bin is associated with a second weight, wherein the first weight increases each time a command is received to read the data stored in the first bin, and wherein the second weight increases each time a command is received to read the data stored in the second bin.

In another embodiment, a storage device comprises a non-volatile storage unit. The capacity of the non-volatile storage unit is divided into a plurality of zones. The non-volatile storage unit comprises a plurality of dies and each of the plurality of dies comprising a plurality of erase blocks. The storage device further comprises a controller coupled to the non-volatile storage unit. The controller is configured to receive a plurality of read commands to read data from a partially full first erase block of a first zone of the plurality of zones non-sequentially. The first erase block comprises a plurality of wordlines and the plurality of wordlines is divided into one or more bins. Each bin is associated with a weight and the weights are based on a location of the bin within the first erase block and an amount of time the first erase block has been open. The controller is further configured to increase each of the weights each time a predetermined amount of time has passed and close the first erase block when a sum of the weights associated with the bins accumulates to a predetermined value or when one or more write commands are received to fill the first erase block to a full write capacity.

The weight of a bin is increase each time a read command is received to read data stored in the bin. A first bin disposed closest to a program point of the partially full first erase block has a higher weight than a second bin disposed closer to a beginning of the partially full first erase block. By closing the first erase block when the one or more write commands are received to fill the first erase block to the full write capacity, the weights of each of the bins are lowered. Each of the bins have a same weight upon closing the first erase block. The weights of the bins vary between about 0.5 to about 3, and wherein the predetermined value is about 1000. The weights of the bins indicate a level of susceptibility to errors.

In another embodiment, a storage device comprises a non-volatile storage unit. The capacity of the non-volatile storage unit is divided into a plurality of zones. The non-volatile storage unit comprises a plurality of dies and each of the plurality of dies comprising a plurality of erase blocks. Each of the plurality of erase blocks comprises a plurality of wordlines and the plurality of wordlines of each erase block are divided into one or more bins. The storage device further comprises a controller coupled to the non-volatile storage unit. The controller is configured to receive one or more first read commands to read data from a first bin of a partially full first erase block of a first zone of the plurality of zones, where the first bin being associated with a first weight, and increase the first weight associated with the first bin after a predetermined amount of time has passed a first time. The controller is further configured to receive one or more second read commands to read data from a second bin of the partially full first erase block, where the second bin being associated with a second weight different than the first weight, and increase the first weight associated with the first bin and the second weight associated with the second bin after the predetermined amount of time has passed a second time. The controller is also configured to receive one or more third read commands to read the data from the first bin, increase the first weight associated with the first bin after the data stored in the first bin is read in response to the one or more third read commands, and close the first erase block when a sum of the first and second weights accumulates to a predetermined value.

The weights of the bins indicate a level of susceptibility to errors. The first bin is disposed closer to a beginning of the first erase block and the second bin is disposed closest to a program point of the first erase block. The controller is configured to receive one or more fourth read commands to read third data from a third bin of the partially full first erase block, where the third bin being associated with a third weight different than the first weight and the second weight, and close the first erase block when a sum of the first, second, and third weights accumulates to a predetermined value. The controller is also configured to increase the first, second, and third weights after the predetermined amount of time has passed a third time and receive one or more write commands to write data to a fourth bin of the first erase block. The controller is further configured to write the data associated with the one or more write commands to the fourth bin, wherein the fourth bin is associated with a fourth weight that is temporarily lower than the first, second, and third weights due to the fourth bin being newly written, and close the first erase block when a sum of the first, second, third, and fourth weights accumulates to a predetermined value. Each weight of each bin is increased each time the data stored in the bin is read and each time the predetermined amount of time expires.

While the foregoing is directed to embodiments of the present disclosure, other and further embodiments of the disclosure may be devised without departing from the basic scope thereof, and the scope thereof is determined by the claims that follow.

What is claimed is:

1. A storage device, comprising:
   a non-volatile storage unit, wherein a capacity of the non-volatile storage unit is divided into a plurality of zones, and wherein the non-volatile storage unit comprises a plurality of dies, each of the plurality of dies comprising a plurality of erase blocks, and each of the plurality of erase blocks comprising a plurality of wordlines; and
   a controller coupled to the non-volatile storage unit, wherein the controller is configured to:
   sequentially write data associated with one or more first commands to one or more wordlines of a plurality of wordlines of a partially full first erase block of a first zone of the plurality of zones, the first erase block having a writeable capacity, wherein the data associated with the one or more first commands partially fills the first erase block to a first program point less than the writeable capacity;
   receive one or more read commands to non-sequentially read data from the plurality of wordlines of the first erase block, wherein:
   each of the one or more read commands is individually associated with a weight of a plurality of first weights,
   at least two weights of the plurality of first weights associated with the one or more read commands are different, and
   each weight of the plurality of first weights is based on a closeness to the first program point of data targeted by a corresponding read command of the one or more read commands, a read count of the data targeted by the corresponding read command, and an amount of time the first erase block has been open; and
   close the first erase block when a sum of the plurality of first weights associated with the one or more read commands accumulates to a predetermined value.

2. The storage device of claim 1, wherein each weight of the plurality of first weights increases each time a predetermined amount of time has passed.

3. The storage device of claim 1, wherein each weight of the plurality of first weights is higher the closer a targeted data of the corresponding read command is to the first program point, and wherein each of the plurality of first weights indicates a level of susceptibility to errors.

4. The storage device of claim 1, wherein the controller is further configured to:
   write data associated with one or more second commands to the first erase block sequentially, wherein the data associated with the one or more second commands partially fills the first erase block to a second program point less than the writeable capacity; and
   receive one or more second read commands to read data from the plurality of wordlines of the first erase block non-sequentially, wherein:
   each of the one or more second read commands is associated with a new weight of a plurality of second weights,
   at least two weights of the plurality of second weights associated with the one or more read second commands are different, and
   each weight of the plurality of second weights is based on a closeness of data targeted by a corresponding second read command of the one or more second read commands to the second program point, a read count of the data targeted by the corresponding second read command, and the amount of time the first erase block has been open.

5. The storage device of claim 1, wherein the plurality of wordlines are grouped into two or more bins, wherein the data associated with the one or more first commands is stored in a first bin of the two or more bins and data associated with one or more second commands is stored in a second bin of the two or more bins.

6. The storage device of claim 5, wherein the first bin is associated with a first weight of the plurality of first weights and the second bin is associated with a second weight of the plurality of first weights, wherein the first weight increases each time a command is received to read the data stored in the first bin, and wherein the second weight increases each time a command is received to read the data stored in the second bin.

7. A storage device, comprising: a non-volatile storage unit, wherein a capacity of the non-volatile storage unit is divided into a plurality of zones, and wherein the non-volatile storage unit comprises a plurality of dies, each of the plurality of dies comprising a plurality of erase blocks; and
   a controller coupled to the non-volatile storage unit, wherein the controller is configured to:
   receive a plurality of read commands to non-sequentially read data from a partially full first erase block of a first zone of the plurality of zones, wherein the first erase block comprises a plurality of wordlines, the plurality of wordlines being grouped into two or more bins, wherein each bin of the two or more bins is associated with a weight of a plurality of weights, and wherein each weight of the plurality of weights is based on a location of the grouped wordlines of each bin within the first erase block and an amount of time the first erase block has been open;
   increase each of the plurality of weights each time a predetermined amount of time has passed; and
   close the first erase block when a sum of the plurality of weights associated with the two or more bins accumulates to a predetermined value or when one or more write commands are received to fill the first erase block to a full write capacity.

8. The storage device of claim 7, wherein the weight of each bin of the two or more bins is increased each time a read command is received to read data stored in the corresponding bin.

9. The storage device of claim 7, wherein a first bin of the two or more bins disposed closest to a program point of the partially full first erase block than others of the two or more bins has a higher weight than a second bin of the two or more bins disposed closer to a beginning of the partially full first erase block than the others of the two or more bins.

10. The storage device of claim 7, wherein closing the first erase block when the one or more write commands are received to fill the first erase block to the full write capacity lowers the weight of each bin of the two or more bins.

11. The storage device of claim 10, wherein each bin of the two or more bins has a same weight value upon closing the first erase block.

12. The storage device of claim 7, wherein the weights of the bins vary between 0.5 to 3, and wherein the predetermined value is 1000.

13. The storage device of claim 7, wherein the weight of each bin of the two or more bins indicate; a level of susceptibility to errors.

14. A storage device, comprising:
a non-volatile storage unit, wherein a capacity of the non-volatile storage unit is divided into a plurality of zones, wherein the non-volatile storage unit comprises a plurality of dies, each of the plurality of dies comprising a plurality of erase blocks, and each of the plurality of erase blocks comprising a plurality of wordlines, wherein the plurality of wordlines of each erase block are grouped into two or more bins; and a controller coupled to the non-volatile storage unit, wherein the controller is configured to:
receive one or more first read commands to read data from wordlines grouped in a first bin of a partially full first erase block of a first zone of the plurality of zones, the first bin being associated with a first weight;
increase the first weight associated with the first bin after a predetermined amount of time has elapsed for a first time;
receive one or more second read commands to read data from wordlines grouped in a second bin of the partially full first erase block, the second bin being associated with a second weight different than the first weight;
increase the first weight associated with the first bin and the second weight associated with the second bin after the predetermined amount of time has elapsed for a second time;
receive one or more third read commands to read the data from the wordlines grouped in the first bin;
increase the first weight associated with the first bin after the data from the wordlines grouped in the first bin is read in response to the one or more third read commands; and
close the first erase block when a sum of the first and second weights accumulates to a predetermined value.

15. The storage device of claim 14, wherein the first and second weights of the two or more bins indicate a level of susceptibility to errors.

16. The storage device of claim 14, wherein the first bin is disposed closer to a beginning of the first erase block than others of the two or more bins and the second bin is disposed closest to a program point of the first erase block than the others of the two or more bins.

17. The storage device of claim 14, wherein the controller is further configured to: receive one or more fourth read commands to read third data from a third bin of the two or more bins of the partially full first erase block, the third bin being associated with a third weight different than the first weight and the second weight; and close the first erase block when a sum of the first, second, and third weights accumulates to the predetermined value.

18. The storage device of claim 17, wherein the controller is further configured to: increase the first, second, and third weights after the predetermined amount of time has elapsed for a third time; receive one or more write commands to write data to a fourth bin of the two or more bins of the partially full first erase block; write the data associated with the one or more write commands to the fourth bin, wherein the fourth bin is associated with a fourth weight that is temporarily lower than the first, second, and third weights due to the fourth bin being newly written; and close the first erase block when a sum of the first, second, third, and fourth weights accumulates to the predetermined value.

19. The storage device of claim 18, wherein each weight of each bin of the two or more bins is increased each time data stored in the corresponding bin is read and each time the predetermined amount of time expires.

* * * * *